May 24, 1932.   L. BOUDIN   1,859,862

PROCESS AND APPARATUS FOR MAKING SHEET GLASS

Filed Nov. 4, 1927

Inventor
LOUIS BOUDIN
Dorsey Cole
Attorneys

Patented May 24, 1932

1,859,862

UNITED STATES PATENT OFFICE

LOUIS BOUDIN, OF ST. GOBAIN, FRANCE, ASSIGNOR TO SOCIETE ANONYME DES MANUFACTURES DES GLACES & PRODUITS CHIMIQUES DE SAINT-GOBAIN, CHAUNY & CIREY, OF PARIS, FRANCE

PROCESS AND APPARATUS FOR MAKING SHEET GLASS

Application filed November 4, 1927, Serial No. 231,107, and in France November 15, 1926.

This invention relates to the continuous manufacture of sheet glass by flowing the glass from a suitable tank, in which it is melted, through an issue opening in a substantially vertical wall, to a reservoir located externally of the furnace and between the furnace and a forming pass. A process of this kind is described in my previous United States Patent No. 1,628,353, granted May 10th, 1927, which patent also shows an apparatus for carrying out such a process.

By my present invention I reduce the temperature of the glass from a high temperature to the lower temperature desirable for rolling, in a reservoir located externally of the furnace and immediately adjacent to the forming pass, so that the glass flows through the issue opening while hot (thus tending to avoid the creation of defects), in more or less of a sheet form, and is cooled, while it is still in a more or less sheet form, immediately in advance of the forming pass to which it feeds and by which it is thinned. Due to the location of the reservoir, the condition of the glass therein may be readily observed, and its temperature controlled, and this latter without affecting the conditions within the melting furnace. This independence of the reservoir temperature conditions from those within the furnace, also permits the rate of cooling to be accelerated so that the glass may be cooled, at the rate found most advantageous, to the temperature proper for rolling, which is close to the temperature at which devitrification is objectionable, and this immediately before it passes to the rolls, so that the period during which devitrification may occur is shortened. This rapid rate of cooling is aided by the fact that the glass in the reservoir is comparatively shallow and more or less in sheet form so that radiation from its surface may cause the desired drop in temperature throughout its depth (with auxiliary means to cool the glass from the bottom if it be found that the glass at the different levels is not sufficiently uniform in temperature), and by selecting a length for the reservoir that will provide for the desired radiation and the resultant cooling.

My invention therefore consists in the methods hereinafter described and in the instrumentalities I have desired for the better carrying out of the same.

Referring to the accompanying drawings in which corresponding parts are designated by corresponding marks of reference—

Figure 1:
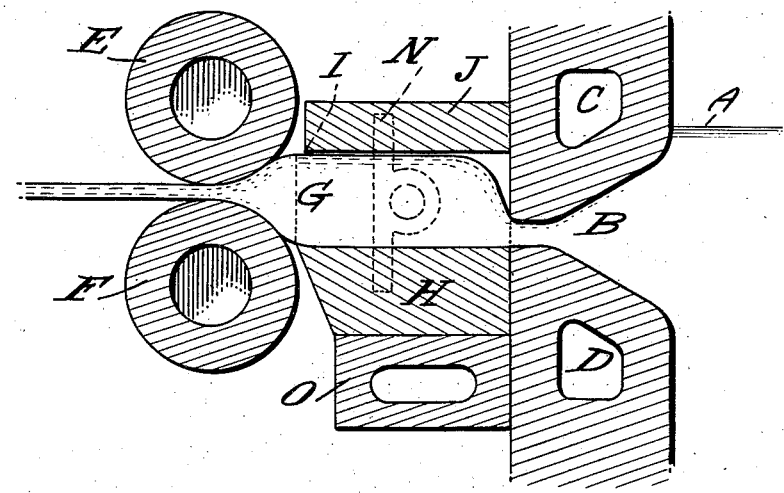
Figure 1 is a vertical longitudinal section through a structure embodying my invention, and adapted to carry out my improved method.
Figure 2:
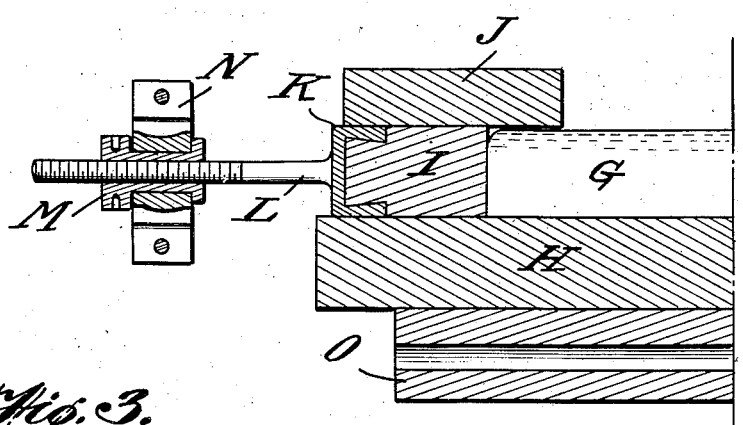
Figure 2 is a fragmental vertical section, taken at right angles to Figure 1.
Figure 3:
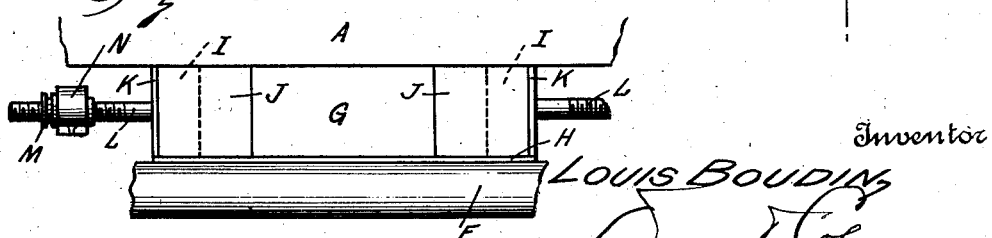
Figure 3 is a plan view of the apparatus shown in Figure 1.

The front wall of the furnace is provided with a horizontal issue opening B in the form of a slot, located somewhat below the glass line of the furnace, which latter is represented by A. Immediately beyond and outside of the slot is the slab H, the front overhanging edge of which terminates immediately behind the lower roll F. The latter roll co-acts with the upper roll E to provide a forming pass and it will be understood that these rolls are driven in any desired manner.

Side blocks I are provided to control the width of the reservoir G. The bottom of the reservoir is formed by the slab H, and on the blocks I may be carried the movable cover plates J, projecting above the level of the glass in the reservoir towards the center line of the reservoir. As shown, the blocks I are adjustable toward the center line of the reservoir by the stem L fastened to the blocks by clamp K, and receiving threaded nut M held in brackets N.

Adjacent to the issue opening B, and in the front wall of the furnace, ducts C, D may be provided to control the temperature of the walls of the opening and in a similar manner the slab H may rest on a hollow support O through the center of which a temperature controlling medium, such as heated or cooled air may be passed for the purpose of controlling the heat losses from the slab H, and thus the temperature of the upper surface thereof.

In the operation of a device such as shown, the glass within the furnace is of relatively high temperature. It therefore flows under the head pressure existing in the furnace through the issue opening B, more or less in the form of a sheet, without resulting in streaks or cords, to the reservoir G, whence it is drawn by the rotation of the rolls through the forming pass, where it is thinned and set and fabricated into sheets.

In the reservoir it is subjected to the loss of temperature, due to radiation from its exposed upper surface.

The extent of heat losses in the glass between issue from the opening B and feed through the forming pass, which should be sufficient to bring the glass to the rolling temperature, may be controlled. Thus by properly selecting the initial proportions of the parts, variations in the cooling effected in the reservoir to suit variations in the temperature conditions in the furnace may be obtained which will result in causing the glass passing into the forming pass to have a temperature suitable for fabrication.

It may be found that the glass at the edges of the reservoir is over-cooled when a desirable condition is obtained in the glass at and near the center line of the reservoir. In such cases the side cover plates J may be employed, the extent of their projection beyond the inner faces of the side blocks being so selected as to obtain the desired temperature conditions at the sides. In some cases their adjustment may be such as to provide a higher temperature of the glass at the edges of the sheet than in the medial line.

Under certain conditions, i. e., relatively deep glass in the reservoir, it may be necessary, in order to obtain a desirable uniformity in the temperature of glass at different levels in the reservoir, to cool the slab H, by air forced through the duct O. With a depth of say two inches, no deleterious results will be produced if the slab H is neither artificially heated or cooled, and under this condition of depth the naturally cooled hearth H will have a temperature at which it will be protected by a film of glass. The continuance of this film is aided by the fact that as the forming pass is above the level of the top of the slab the drawing operation of the pass is mainly directed to setting up a current of glass in the upper level of the reservoir.

The depth of glass in the reservoir will obviously vary with the level of glass in the furnace and the temperature thereof as well as with the angular speed with which the rolls E and F are driven. Good results have been obtained with the apparatus here disclosed in making sheet glass one-eighth of an inch thick with a depth of glass in the reservoir of one and one-half to two and one-half inches and a vertical width of the issue opening of about one and one-quarter inches.

The location of the lower roll F serves, as is described in my aforesaid prior patent, to lift the glass flowing over the edge of the slab H, upwardly to the forming pass, and if the rate of flow through the issue opening, due to the depth of glass in the reservoir, is sufficient, the upper roll serves to depress the level of the glass in the reservoir at its forward end. Thus under certain conditions of operation there may result, as is shown in Figure 1, a meniscus on the upper surface of the glass in the reservoir, as is described in the aforesaid patent, but it will be understood that the invention here claimed is independent of the existence of such meniscus.

The issue opening should be of a width as great as that of the reservoir, so that the sheet of hot glass issuing from the opening onto the hearth will not be extended laterally in the reservoir. The side blocks I, in determining the width of the reservoir, determine also the effective width of the issue opening and also the width of the finished sheet.

Having thus described my invention what I claim as new, and desire to secure by Letters Patent is:—

1. The hereinbefore described method of forming sheet glass, which comprises flowing from a furnace highly heated molten glass in sheet form through a submerged issue slot into a reservoir, cooling the glass in the reservoir as it moves therethrough in sheet form, by variably controlling the radiation of heat from different transverse portions of the surface of the glass sheet, and passing the glass through a forming pass to compact the sheet after its temperature has been sufficiently reduced.

2. The combination of a glass furnace having an issue opening in the wall thereof below the glass level therein, of a reservoir external to the furnace and adjacent to the opening, movable side cover plates above the side of the opening to control radiation from the edges of the reservoir, and a pair of rolls having a forming pass between them located in front of the reservoir.

In testimony whereof I hereunto affix my signature.

LOUIS BOUDIN.